(12) United States Patent
Tan et al.

(10) Patent No.: US 9,015,521 B2
(45) Date of Patent: Apr. 21, 2015

(54) METHOD FOR SWITCHING A NODE CONTROLLER LINK, PROCESSOR SYSTEM, AND NODE

(71) Applicant: Huawei Technologies Co., Ltd., Shenzhen (CN)

(72) Inventors: Haibo Tan, Shenzhen (CN); Zhenguo Wang, Hangzhou (CN); Baifeng Yu, Hangzhou (CN); Ping Huang, Shenzhen (CN); Junfeng Zhao, Shenzhen (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 216 days.

(21) Appl. No.: 13/712,588

(22) Filed: Dec. 12, 2012

(65) Prior Publication Data

US 2013/0103975 A1    Apr. 25, 2013

Related U.S. Application Data

(63) Continuation of application No. PCT/CN2011/078893, filed on Aug. 25, 2011.

(51) Int. Cl.
*G06F 11/00* (2006.01)
*G06F 11/20* (2006.01)
*H04L 12/26* (2006.01)

(52) U.S. Cl.
CPC .......... *G06F 11/202* (2013.01); *G06F 11/2002* (2013.01); *H04L 43/0882* (2013.01); *G06F 11/2017* (2013.01)

(58) Field of Classification Search
CPC ... G06F 11/0754; G06F 11/076; G06F 11/20; G06F 11/2002; G06F 11/2005; G06F 11/202; G06F 11/2033; G06F 11/2017; H04L 43/0882

USPC .......... 714/4.1, 4.11, 4.2, 4.3, 4.5, 47.1, 47.2, 714/43
See application file for complete search history.

(56) References Cited

U.S. PATENT DOCUMENTS 7,502,884 B1 * 3/2009 Shah et al. ..................... 710/316
7,778,157 B1 * 8/2010 Tawri et al. ................... 370/216
(Continued)

FOREIGN PATENT DOCUMENTS

CN          1805411 A      7/2006
CN        101072087 A     11/2007
(Continued)

OTHER PUBLICATIONS

Extended European Search Report issued in corresponding European Patent Application No. 11864888.0, mailed Jul. 16, 2013, 5 pages.
(Continued)

*Primary Examiner* — Joseph D Manoskey
(74) *Attorney, Agent, or Firm* — Brinks Gilson & Lione

(57) ABSTRACT

Embodiments of the present invention disclose a method for switching an NC link, a processor system, and a node, where the processor system includes more than two nodes capable of communicating with each other, each node includes a node controller NC chip, a host bus adapter HBA apparatus, and at least one CPU, the NC chip is connected to each CPU in a node where the NC chip is located, and the HBA apparatus is connected to each CPU in a node where the HBA apparatus is located; an NC link borne by the NC chip is corresponding to an HBA link borne by the HBA apparatus. By using an HBA apparatus to deploy a redundant link, the cost of deploying the redundant link is reduced effectively under a premise of ensuring the reliability of the processor system.

9 Claims, 7 Drawing Sheets

(56) References Cited

U.S. PATENT DOCUMENTS

| | | |
|---|---|---|
| 2003/0187987 A1* | 10/2003 | Messick et al. ............... 709/226 |
| 2006/0274787 A1 | 12/2006 | Pong |
| 2008/0082314 A1* | 4/2008 | Kochar et al. ................... 703/25 |
| 2008/0215818 A1 | 9/2008 | Kornegay et al. |
| 2010/0122111 A1 | 5/2010 | Allen et al. |
| 2010/0241894 A1 | 9/2010 | Patel et al. |
| 2010/0251005 A1 | 9/2010 | Kitano |
| 2011/0016254 A1* | 1/2011 | McGee et al. ............... 710/313 |

FOREIGN PATENT DOCUMENTS

| | | |
|---|---|---|
| CN | 101741831 A | 6/2010 |
| CN | 102141975 A | 8/2011 |

OTHER PUBLICATIONS

Office Action issued in corresponding Chinese Patent Application No. 201180001863,5, mailed Jan. 22, 2013.

International Search Report issued in corresponding PCT Patent Application No. PCT/CN2011/078893, mailed May 31, 2012.

* cited by examiner

METHOD FOR SWITCHING A NODE CONTROLLER LINK, PROCESSOR SYSTEM, AND NODE

This application is a continuation of International Application No. PCT/CN2011/078893, filed on Aug. 25, 2011, which is hereby incorporated by reference in its entirety.

FIELD OF THE INVENTION

Embodiments of the present invention relate to the field of communications technologies, and in particular, to a method for switching an NC link, a processor system, and a node.

BACKGROUND OF THE INVENTION

With the progress of technologies, the people have a higher and higher requirement on the performance of a processor. Corresponding to the requirement, the people have developed processor systems with stronger processing capabilities, for example, processor system architectures such as SMP (Symmetric Multi-Processor, symmetric multi-processor) system, Cluster (cluster) system, MPP (Massive Parallel Processing, massive parallel processing) system, and NUMA (Non Uniform Memory Access, non uniform memory access) system. The architectures achieve system performance improvement mainly in a manner of sharing a memory and an IO bus. For example, in the architecture of the NUMA system, nodes are connected and exchange information with each other through an interconnection module, and under one OS (operating system), share all CPUs and share memories of the whole system, and thereby performance optimization and improvement of the processor system is achieved.

At present, both the SMP system and the NUMA system adopt a redundant link solution with dual NC (Node Controller, node controller) chips. When a failure occurs in one of the NC links, all services on the NC link are switched to the other redundant NC link to ensure that the services are not interrupted and the performance of the processor system is not affected, and thereby the availability of the whole processor system is improved.

The prior art at least has the following disadvantages.

Because of the high cost and long development cycle of the NC chip, the cost of the deployment of the redundant NC link is excessively high. Furthermore, the redundant NC link has a very low utilization ratio but still occupies bus (such as a QPI (QuickPath Interconnect) interface and an HT (HyperTransport) bus) resources of the processor system, which goes against the expansion of the processor system when the bus resources of the processor system are insufficient

SUMMARY OF THE INVENTION

Embodiments of the present invention provide a method for switching an NC link, a processor system, and a node, so as to reduce the cost of a redundant link under a premise of maintaining the reliability of a processor system.

An embodiment of the present invention provides a method for switching a node controller link, where a processor system includes more than two nodes capable of communicating with each other, each node includes one node controller NC chip, one host bus adapter HBA apparatus, and at least one CPU, the NC chip is connected to each CPU in a node where the NC chip is located, the HBA apparatus is connected to each CPU in a node where the HBA apparatus is located, and an NC link borne by the NC chip is corresponding to an HBA link borne by the HBA apparatus. The method includes: when it has been detected that a failure occurs in an NC chip, switching a service on an NC link borne by the NC chip to a corresponding HBA link.

An embodiment of the present invention further provides a processor system, where: the processor system includes more than two nodes capable of communicating with each other; each node includes one node controller NC chip, one host bus adapter HBA apparatus, and at least one CPU, the NC chip is connected to each CPU in a node where the NC chip is located, the HBA apparatus is connected to each CPU in a node where the HBA apparatus is located, and an NC link borne by the NC chip is corresponding to an HBA link borne by the HBA apparatus; and the node is configured to, when it has been detected that a failure occurs in an NC chip of the node itself, switch a service on an NC link borne by the NC chip to a corresponding HBA link.

An embodiment of the present invention further provides a node, where the node includes:

one node controller NC chip, one host bus adapter HBA apparatus, a controller, and at least one CPU, where the NC chip is connected to each CPU in the node where the NC chip is located, the HBA apparatus is connected to each CPU in the node where the HBA apparatus is located, and an NC link borne by the NC chip is corresponding to an HBA link borne by the HBA apparatus; and the controller is configured to, when it has been detected that a failure occurs in the NC chip of the node itself, switch a service on the NC link borne by the NC chip to the corresponding HBA link.

In the method for switching an NC link, the processor system, and the node according to the embodiments of the present invention, an HBA apparatus is used to deploy a redundant link. Because the HBA apparatus features a low hardware cost, a simple design, and a short development cycle, the use of an HBA apparatus for deploying the redundant HBA link can effectively reduce the cost of deploying the redundant link under the premise of ensuring the reliability of the processor system. Because an HBA apparatus connected to a CPU or a north bridge chip supports hot swap, it is very convenient to connect or replace the HBA apparatus, and thereby the RAS characteristics of the processor system are improved. Because the HBA apparatus does not occupy bus resources of the system, it is convenient to expand the processor system. When the load of a service on an NC link reaches a specific value, part of the service on the NC link is switched to an HBA link, which achieves balanced distribution of the service load and improves a utilization ratio of the HBA link at the same time.

DETAILED DESCRIPTION OF THE EMBODIMENTS

In order to make the foregoing objectives, features, and advantages of the present invention more comprehensible, the embodiments of the present invention are further described in detail in the following with reference to the accompanying drawings and specific implementation manners.

Embodiment 1

This embodiment provides a method for switching an NC link. A processor system involved in the switching method includes more than two nodes capable of communicating with each other, where each node includes one NC chip, one host bus adapter HBA (Host Bus Adapter, host bus adapter) apparatus, and at least one CPU, the NC chip is connected to each CPU in a node where the NC chip is located, the HBA apparatus is connected to each CPU in a node where the HBA apparatus is located, and an NC link borne by the NC chip is corresponding to an HBA link borne by the HBA apparatus.

Figure 1:
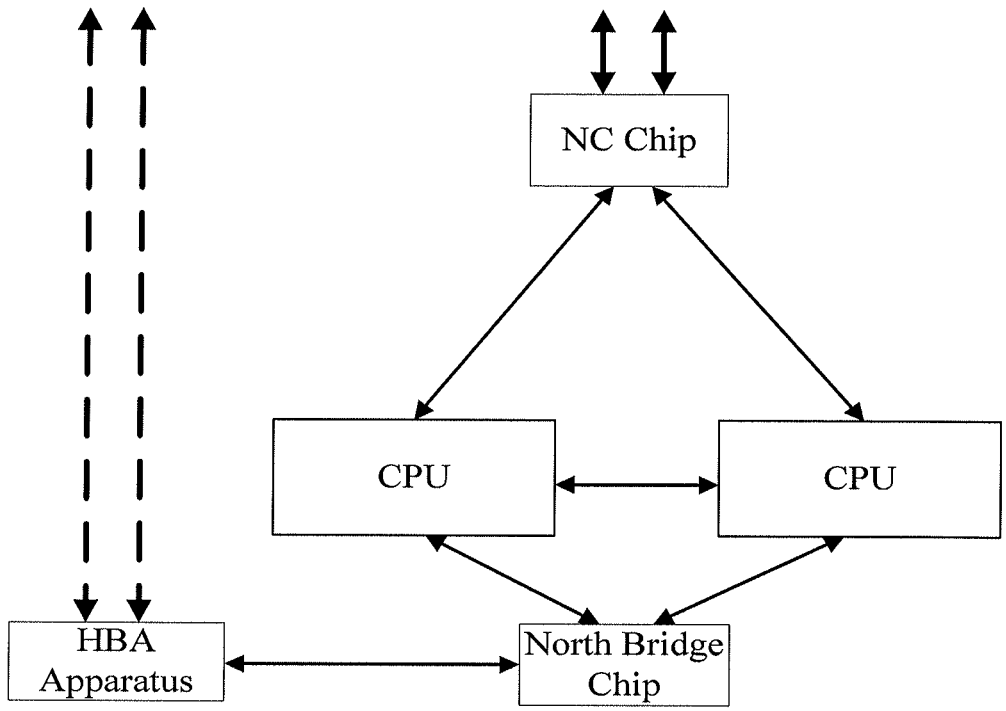
FIG. 1 is a schematic diagram of a first connection manner of an HBA apparatus and a CPU according to the present invention.

There may be two manners for connecting the HBA apparatus to each CPU in a node where the HBA apparatus is located:

(1) The HBA apparatus is inserted in a north bridge chip, and the north bridge chip is connected to each CPU through a front side bus. Referring to FIG. 1, a case that one node includes two CPUs is taken for example.

Normally, the HBA apparatus uses a PCIE (Peripheral Component Interconnect Express, peripheral component interconnect express) interface. A PCIE slot may be expanded on the north bridge chip to connect the HBA apparatus.

Figure 2:
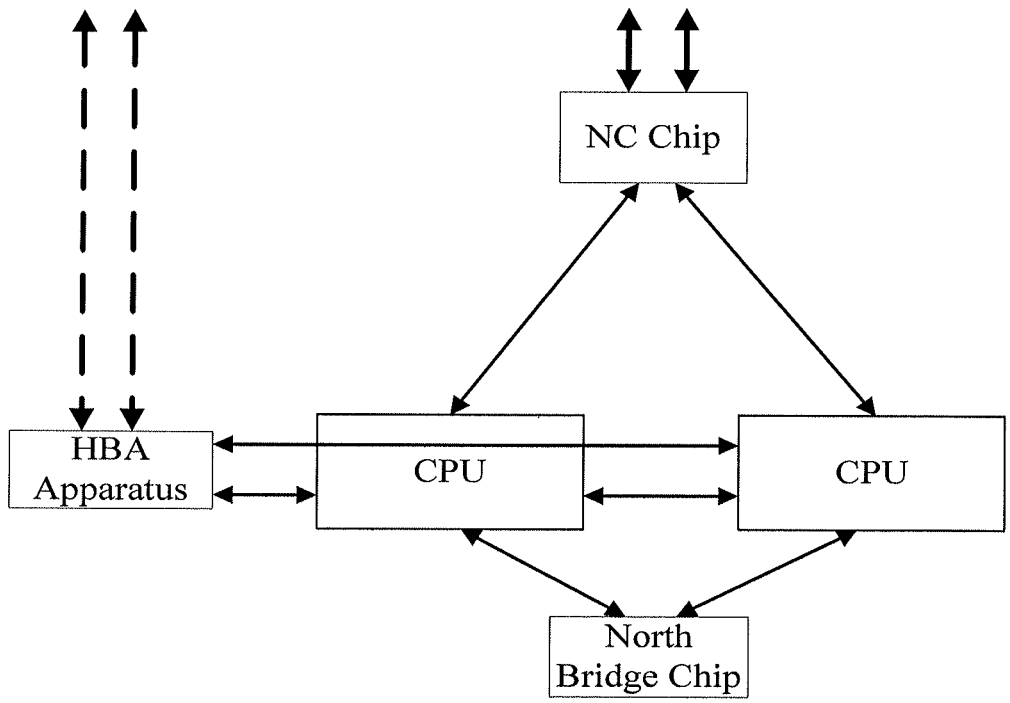
FIG. 2 is a schematic diagram of a second connection manner of an HBA apparatus and a CPU according to the present invention.

(2) Referring to FIG. 2, the HBA apparatus is directly mounted onto each CPU.

A PCIE controller is integrated in some CPU chips, and therefore, the HBA apparatus may be directly mounted in the PCIE slot extending out from a CPU.

Figure 3:
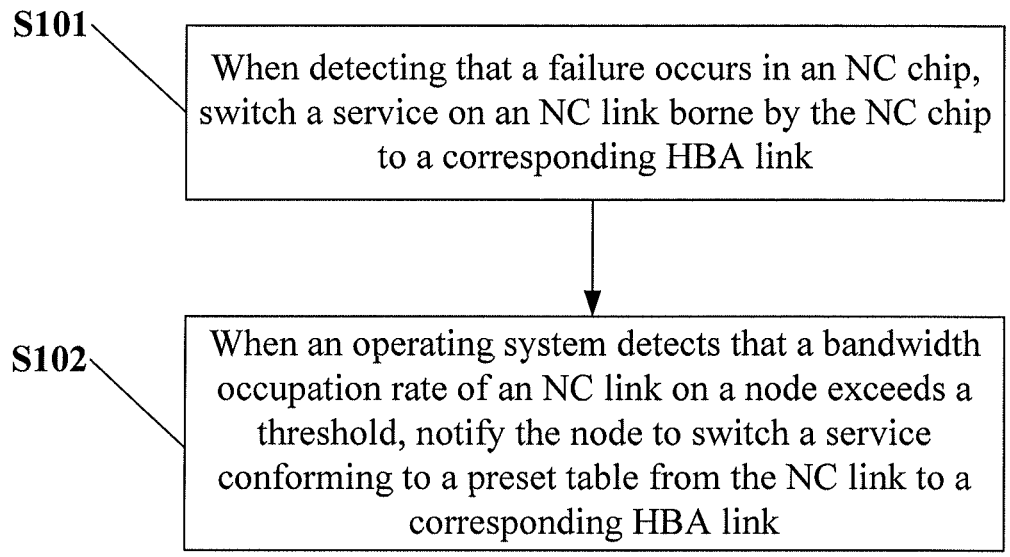
FIG. 3 is a schematic flowchart of an embodiment of a method for switching an NC link according to the present invention.

The method includes the following steps (referring to FIG. 3).

S101: When it has been detected a failure occurs in an NC chip, switch a service on an NC link borne by the NC chip to a corresponding HBA link.

A detection action may be performed by a switching device (such as a switch and a router) in the processor system or by a node where the NC chip in which the failure occurs is located; a switching action may be initiated by the node where the NC chip in which the failure occurs is located.

Because the HBA apparatus features a low hardware cost and a simple design, use of the HBA apparatus for deploying a redundant HBA link can effectively reduce the cost of deploying the redundant link under a premise of ensuring the reliability of the processor system.

Because usually many PCIE slots are reserved on a mother board and many HBA apparatuses support hot swap, it is very convenient to connect and replace an HBA apparatus and the RAS (Reliability, Availability, Serviceability, high reliability, high availability, high serviceability) characteristics of the processor system are improved. In addition, the HBA apparatus does not occupy bus resources of the system and does not limit the expansion of the processor system.

The NC link borne by the NC chip is corresponding to the HBA link borne by the HBA apparatus. Specifically, a first routing table and a second routing table are preset in each node, where the first routing table is a routing table of an NC chip in each node and each NC chip is corresponding to an address of the node where the NC chip is located; the second routing table is a routing table of an HBA apparatus in each node and each HBA apparatus is corresponding to an address of the node where the HBA apparatus is located; the first routing table is corresponding to the second routing table through a node address.

Node resources seen through the first routing table are consistent with those seen through the second routing table, and the node resources may include a CPU, a memory, and an IO resource (such as a PCIE device) and so on.

If an NC chip does not have a switching function, it is required to establish an NC link and an HBA link through a switching device. In this case, in addition to a node address, the first routing table further includes a port of a switching device which is in an NC switching network and corresponding to the node; in addition to a node address, the second routing table further includes a port of a switching device which is in an HBA switching network and corresponding to the node.

Figure 4:
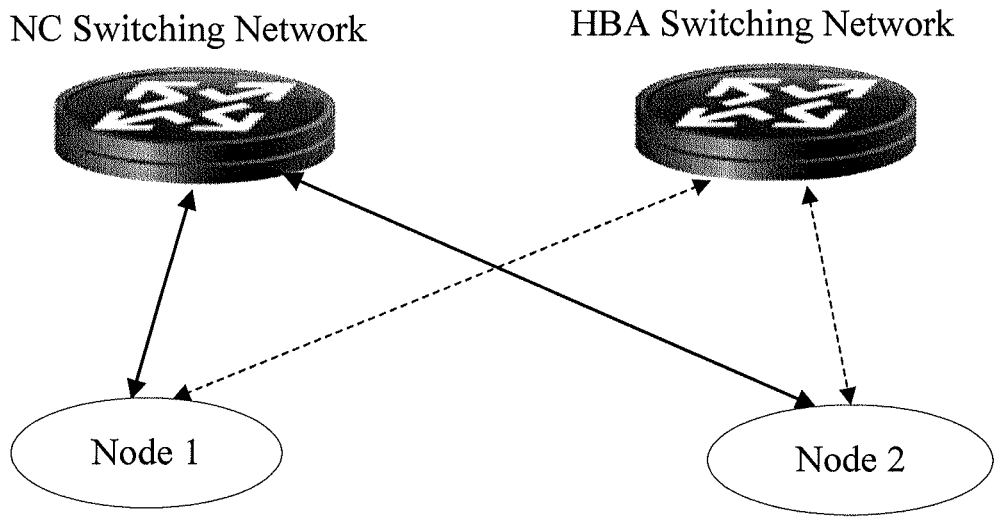
FIG. 4 is a schematic diagram of an NC switching network and an HBA switching network according to the present invention.
Figure 5:
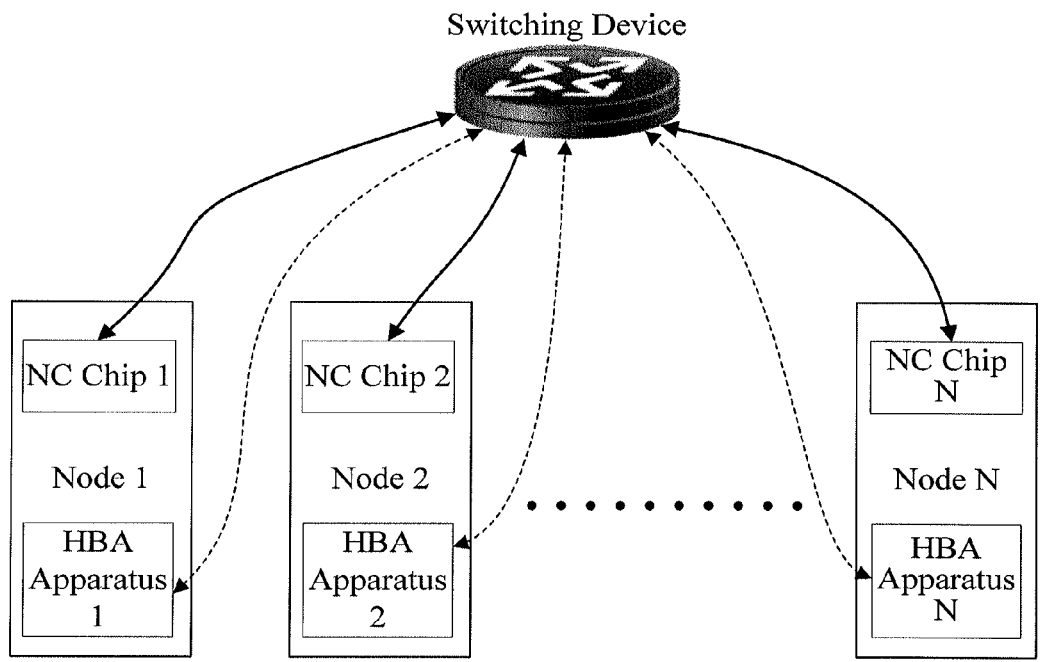
FIG. 5 is a schematic diagram of an NC link and an HBA link according to the present invention.

No matter whether an NC chip in a node has a switching function, the NC switching network and the HBA switching network exist. The NC switching network is a switching network among NC chips, and the HBA switching network is a switching network among HBA apparatuses (referring to FIG. 4). The NC switching network and the HBA switching network may use two respective independent switching devices, or share a same switching device (referring to FIG. 5), where an NC link is indicated by a solid line and an HBA link is indicated by a dotted line. The switching device also need to store a first routing table and a second routing table, and the first routing table and the second routing table of the switching device may be controlled by an operating system to synchronize with those of each node.

In a normal case, an NC link and an HBA link are always unblocked, and two parties bearing the links (for example, between a node and another node or between a node and a switching device) ceaselessly transmit a handshake signal on a corresponding link to detect whether the link is unblocked and available. If an NC chip in a node is normal and the HBA link corresponding to the node is not used, the node may assign one thread to the HBA link for handshake signal training. When a failure occurs in the NC chip, the node may assign more threads to the HBA link so as to take over a service switched by the NC link, thereby achieving smooth switching of the service and ensuring the reliability of the processor system.

In S101, the switching a service on an NC link to a corresponding HBA link may include:

searching, by the node where the NC chip in which the failure occurs is located, for an address of the node by using the first routing table;

searching for an HBA apparatus corresponding to the address by using the second routing table; and switching a service on an NC link borne by the NC chip in which the failure occurs to an HBA link borne by the corresponding HBA apparatus.

Furthermore, the method may further include: S102: When the operating system detects that a bandwidth occupation rate of an NC link on a node exceeds a threshold, notify the node to switch a service conforming to a preset table from the NC link to a corresponding HBA link.

The threshold may be predefined by a user and adjusted as required to determine whether the service volume exceeds a certain load. The preset table lists types of services suitable to be switched from the NC link to the HBA link. The services may be those which have a low real-time requirement, such as services for a PCIE device, an external storage device or an IO storage device. The preset table may be buffered in a memory of the node. In this manner, when the service volume on the NC link reaches a certain load, the balance of service load distribution may be achieved and the utilization ratio of the HBA link is improved.

Figure 6:
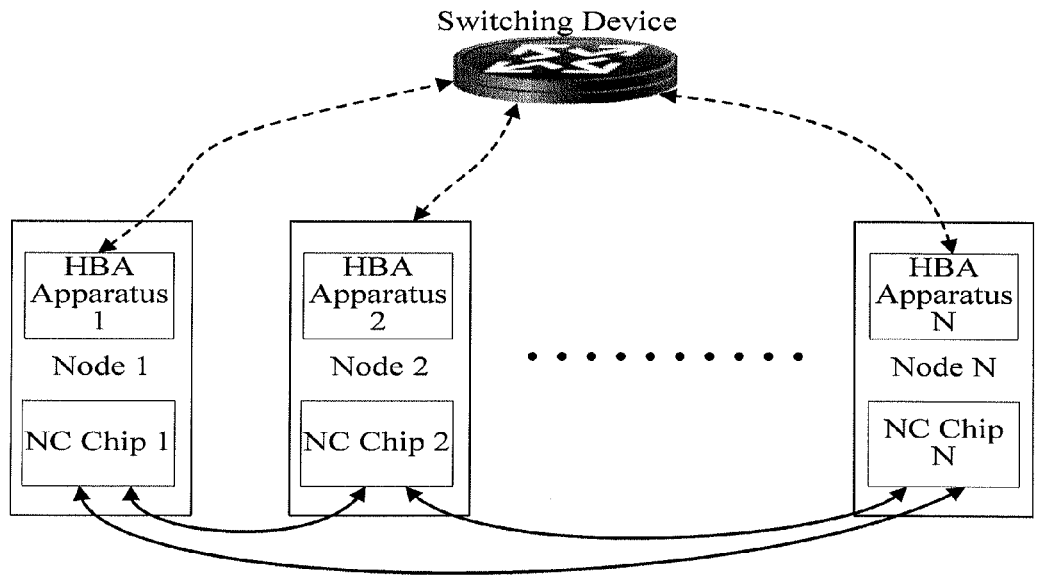
FIG. 6 is a schematic diagram of a connection manner of an NC chip, an HBA apparatus, and a switching device according to the present invention.
Figure 7:
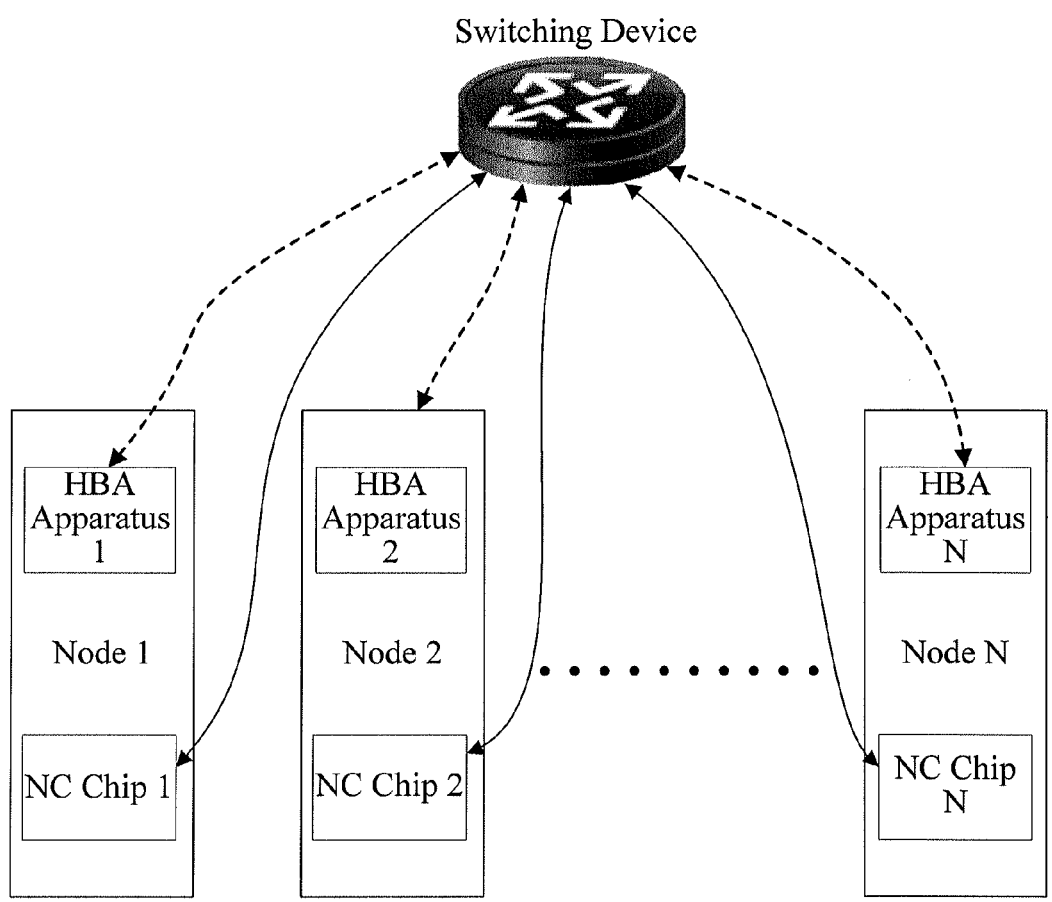
FIG. 7 is a schematic diagram of another connection manner of an NC chip, an HBA apparatus, and a switching device according to the present invention.

For an NC chip with a switching function, an NC link is a link which is directly formed between NC chips, referring to FIG. 6. For an NC chip without a switching function, an NC link is a link which is formed between an NC chip and a switching device, referring to FIG. 7. However, an HBA link is always a link formed between an HBA apparatus and a switching device.

A specific example is given below to introduce the foregoing switching method.

Figure 8:
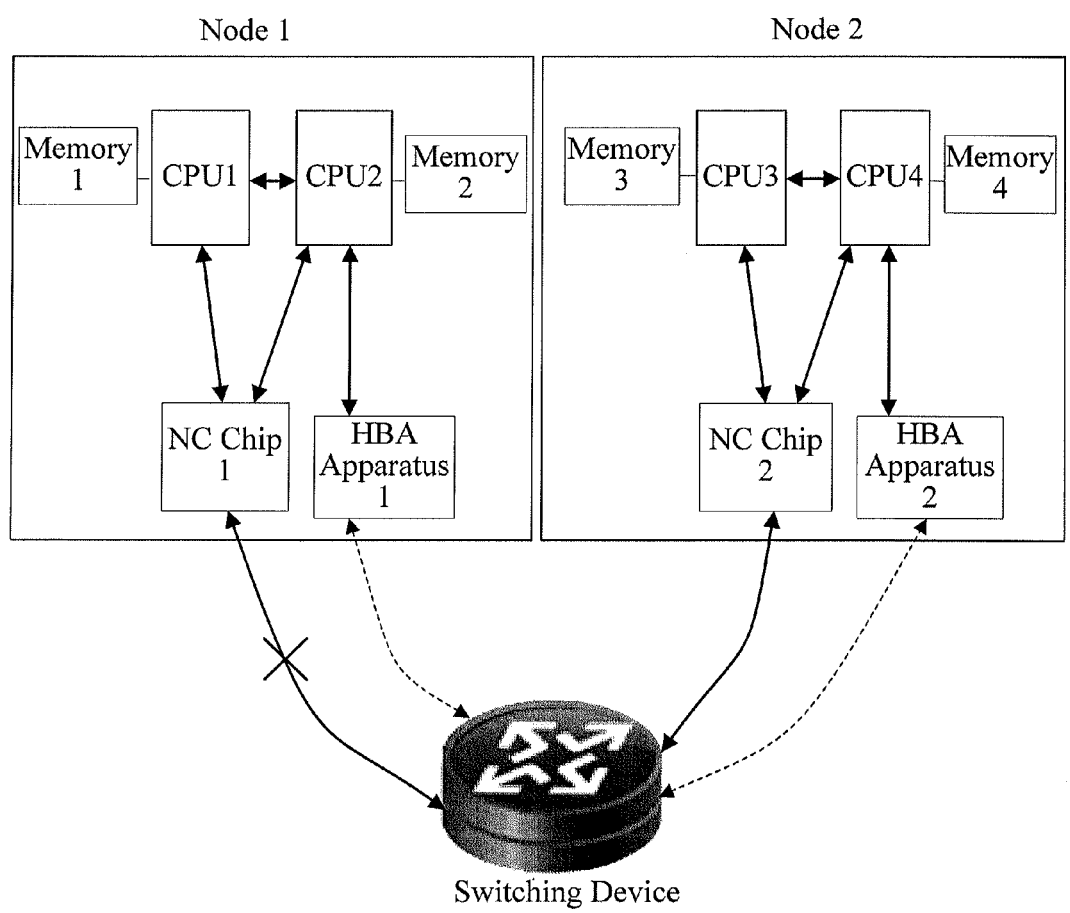
FIG. 8 is a schematic diagram of a specific example of a method for switching an NC link according to the present invention.

Referring to FIG. 8, it is supposed that a processor system has two nodes: a node 1 and a node 2, and NC chips and HBA apparatuses in the node 1 and the node 2 form an NC link and an HBA link through a same switching device. If CPU1 in the node 1 needs to access the memory of CPU4 in the node 2, in a normal case, a general path of CPU1 accessing the memory of CPU4 is: CPU1—NC Chip 1—Switching Device—NC Chip 2—CPU4—Memory 4. When a failure occurring in the NC Chip 1 causes that a failure occurs in the NC link between the NC Chip 1 and the switching device, the node 1 switches a service on the NC link borne by the NC Chip 1 to the HBA link borne correspondingly by an HBA Apparatus 1. In this case, the path of CPU1 accessing the memory of CPU4 is: CPU1—HBA Apparatus 1—Switching Device—NC Chip 2—CPU4—Memory 4.

The foregoing method for switching an NC link is applicable to SMP system architecture, NUMA system architecture, a cluster, cloud computing, and so on. If the processor system in this embodiment is wholly regarded as one node, the method may be further used in MMP system architecture.

In the method for switching an NC link in this embodiment, the HBA apparatus is used to deploy a redundant link. Because the HBA apparatus features a low hardware cost, a simple design, and a short development cycle, use of the HBA apparatus for deploying a redundant HBA link can effectively reduce the cost of deploying the redundant link under a premise of ensuring the reliability of the processor system. Because the HBA apparatus connected to the CPU or the north bridge chip supports the hot swap, it is very convenient to connect and replace the HBA apparatus, which improves the RAS characteristics of the processor system. Because the HBA apparatus does not occupy bus resources of the system, it is convenient to expand the processor system. When the load of a service on an NC link reaches a specific value, part of the service on the NC link is switched to an HBA link, which achieves balanced distribution of the service load and improves the utilization ratio of the HBA link at the same time.

Embodiment 2

Figure 9:
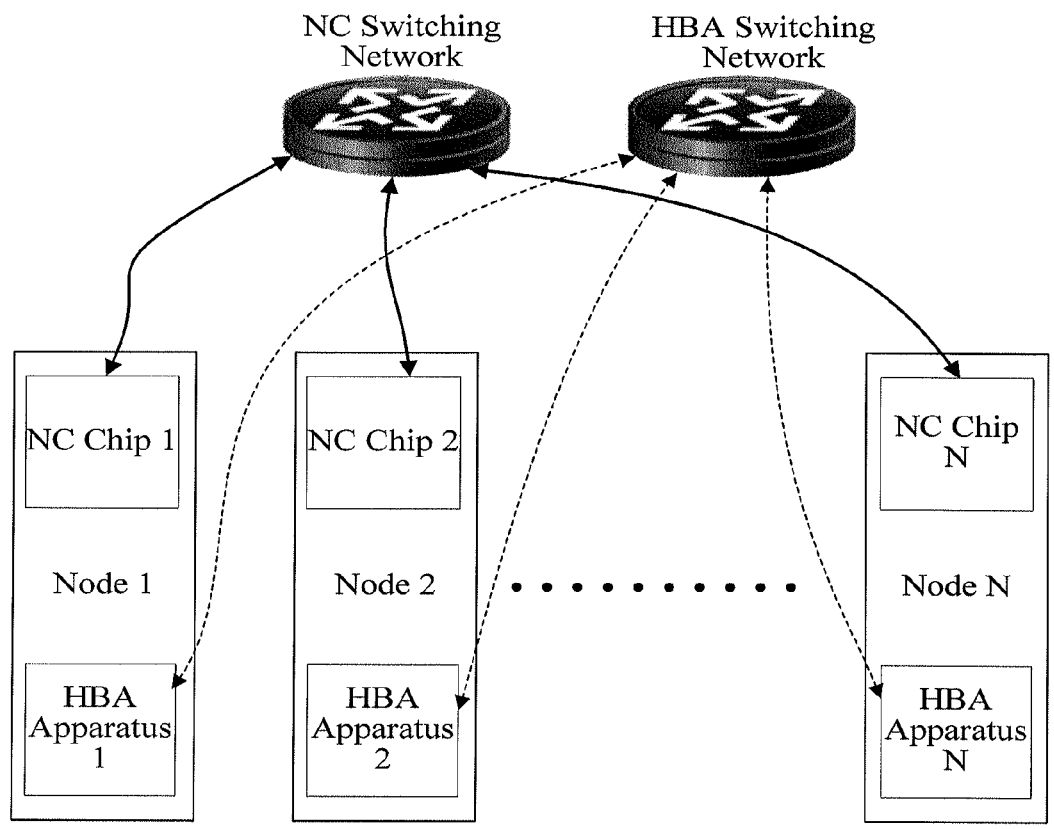
FIG. 9 is a schematic structural diagram of a processor system according to the present invention.

This embodiment provides a processor system. Referring to FIG. 9, the processor system includes more than two nodes capable of communicating with each other.

Each node includes a single NC chip, a single HBA apparatus, and at least one CPU. The NC chip is connected to each CPU in a node where the NC chip is located, the HBA apparatus is connected to each CPU in a node where the HBA apparatus is located, and an NC link borne by the NC chip is corresponding to an HBA link borne by the HBA apparatus.

The node is configured to, when it has been detected that a failure occurs in an NC chip of the node itself, switch a service on an NC link borne by the NC chip to a corresponding HBA link.

The node is further configured to:

store a first routing table and a second routing table which are preset, where the first routing table is a routing table of an NC chip in each node and each NC chip is corresponding to an address of the node where the NC chip is located, the second routing table is an routing table of an HBA apparatus in each node and each HBA apparatus is corresponding to an address of the node where the HBA apparatus is located, and the first routing table is corresponding to the second routing table through a node address.

The node is further configured to:

switch a service that is on the NC link and conforms to a preset table to the corresponding HBA link, when receiving a notification of an operating system about switching the NC link in this node.

In the processor system according to this embodiment, the HBA apparatus is used to deploy a redundant link. Because the HBA apparatus features a low hardware cost, a simple design, and a short development cycle, use of the HBA apparatus for deploying a redundant HBA link by can effectively reduce the cost of deploying the redundant link under a premise of ensuring the reliability of the processor system. Because the HBA apparatus connected to a CPU or a north bridge chip supports hot swap, it is very convenient to connect and replace the HBA apparatus, which improves the RAS characteristics of the processor system. Because the HBA apparatus does not occupy bus resources of the system, it is convenient to expand the processor system. When the load of a service on an NC link reaches a specific value, part of the service on the NC link is switched to an HBA link, which achieves balanced distribution of the service load and improves the utilization ratio of the HBA link at the same time.

Embodiment 3

Figure 10:
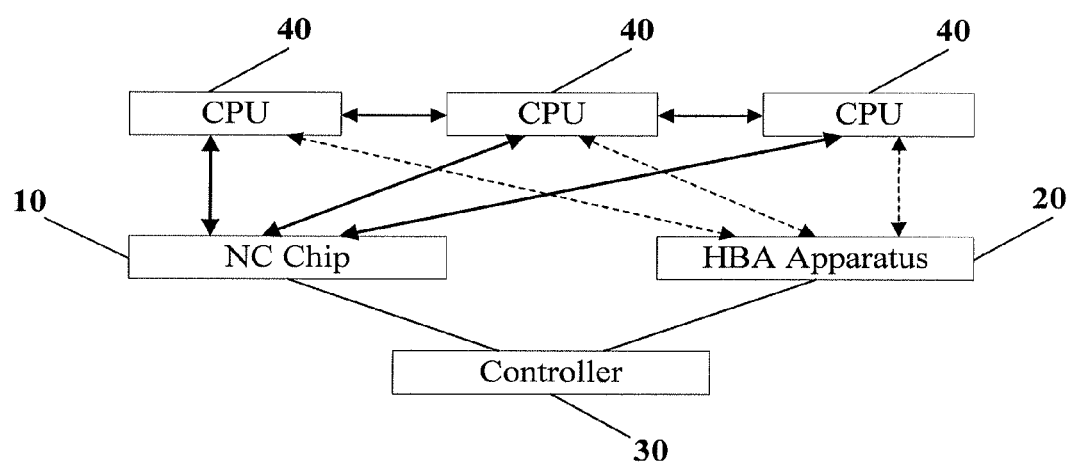
FIG. 10 is a schematic frame diagram of a first embodiment of a node according to the present invention.

This embodiment provides a node. Referring to FIG. 10, the node includes:

a single NC chip 10, a single host bus adapter HBA apparatus 20, a controller 30, and at least one CPU 40 (for example, three CPUs are included in FIG. 10). The NC chip 10 is connected to each CPU 40 in the node where the NC chip 10 is located, the HBA apparatus 20 is connected to each CPU 40 in the node where the HBA apparatus 20 is located, and an NC link borne by the NC chip 10 is corresponding to an HBA link borne by the HBA apparatus 20.

The controller 30 is configured to, when it has been detected that a failure occurs in the NC chip of the node itself, switch a service on the NC link borne by the NC chip 10 to the corresponding HBA link.

Figure 11:
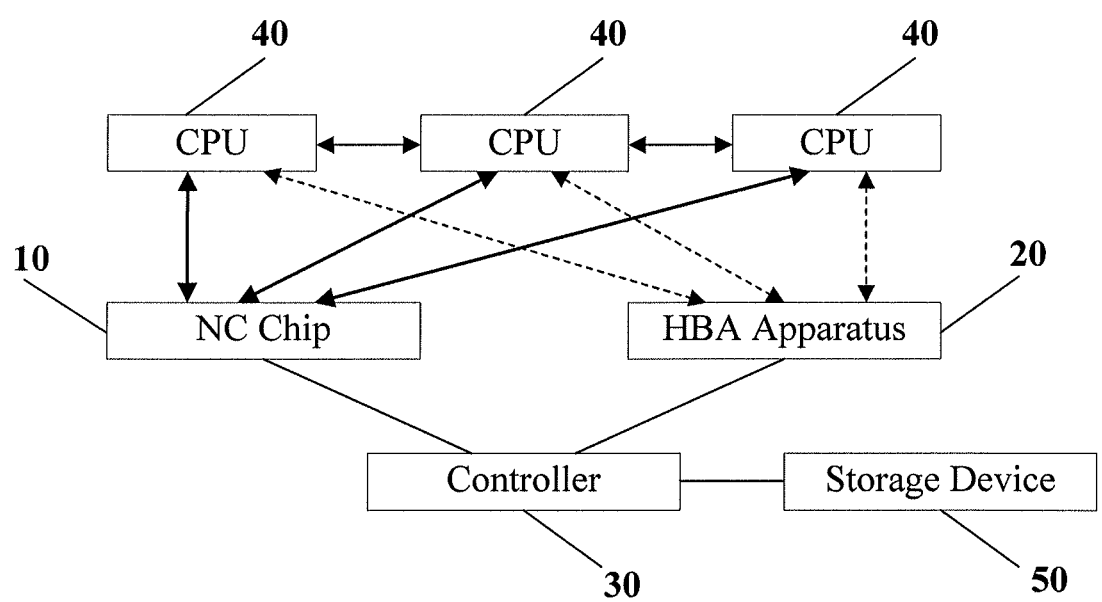
FIG. 11 is a schematic frame diagram of a second embodiment of a node according to the present invention.

Referring to FIG. 11, the node further includes a storage device 50 configured to store a first routing table and a second routing table which are preset, where the first routing table is a routing table of an NC chip in each node and each NC chip is corresponding to an address of the node where the NC chip is located; the second routing table is a routing table of an HBA apparatus in each node and each HBA apparatus is corresponding to an address of the node where the HBA apparatus is located, and the first routing table is corresponding to the second routing table through a node address.

The controller 30 is further configured to:

switch a service that is on the NC link and conforms to a preset table to the corresponding HBA link, when receiving a notification of an operating system about switching the NC link of this node. The preset table may be located in a memory of a CPU in the node; or a memory is independently configured in the controller, and the preset table is located in the memory of the controller; or the preset table is stored in the storage device 50.

In the node according to this embodiment, the HBA apparatus is used to deploy a redundant link. Because the HBA apparatus features a low hardware cost, a simple design, and a short development cycle, use of the HBA apparatus for deploying a redundant HBA link can effectively reduce the cost of deploying the redundant link under a premise of ensuring the reliability of the processor system. Because the HBA apparatus connected to a CPU or a north bridge chip supports hot swap, it is very convenient to connect and replace the HBA apparatus, which improves the RAS characteristics of the processor system. Because the HBA apparatus does not occupy bus resources of the system, it is convenient to expand the processor system. When the load of a service on an NC link reaches a specific value, part of the service on the NC link is switched to an HBA link, which achieves balanced distribution of the service load and improves the utilization ratio of the HBA link at the same time.

Because many contents of Embodiment 2 and Embodiment 3 are similar to those of Embodiment 1, Embodiment 2 and Embodiment 3 are introduced roughly. For the related parts, please refer to Embodiment 1.

Persons of ordinary skill in the art may understand that all or part of the steps of the method according to the embodiments of the present invention may be implemented by a program instructing relevant hardware. The program may be stored in a computer readable storage medium. The storage medium may be a ROM/RAM, a magnetic disk or an optical disk.

It should be noted that relational terms such as "first" and "second" are just used to differ one entity or operation from another entity or operation in this document, and do not require or imply any actual relationships or sequences among these entities or operations. Furthermore, the term "include", "include" or any of its derivatives are intended to convey a non-exclusive connotation, so that a process, a method, an article or a device including a series of elements not only includes those elements, but also includes other elements which are not listed explicitly, or further includes inherent elements of the process, the method, the article or the device. If no more limitations are made, an element limited by "include a/an . . . " does not exclude other same elements which exist in the process, the method, the article, or the device which includes the element.

The foregoing descriptions are merely exemplary embodiments of the present invention, and not intended to limit the protection scope of the present invention. Any modification, equivalent replacement, and improvement made without departing from the spirit and principle of the present invention fall within the protection scope of the present invention.

What is claimed is:

1. A method for switching a node controller link, wherein a processor system comprises more than two nodes capable of communicating with each other, each node comprises one node controller NC chip, one host bus adapter HBA apparatus, and at least one CPU, the NC chip is connected to each CPU in a node where the NC chip is located, the HBA apparatus is connected to each CPU in a node where the HBA apparatus is located, and an NC link borne by the NC chip corresponds to an HBA link borne by the HBA apparatus; the method comprises:

when it has been detected that a failure occurs in an NC chip, switching a service on an NC link borne by the NC chip to a corresponding HBA link;

wherein that an NC link borne by the NC chip that corresponds to an HBA link borne by the HBA apparatus comprises: presetting a first routing table and a second routing table in each node, wherein the first routing table is a routing table of an NC chip in each node and each NC chip corresponds to an address of a node where the NC chip is located, the second routing table is a routing table of an HBA apparatus in each node and each HBA apparatus corresponds to an address of a node where the HBA apparatus is located, and the first routing table corresponds to the second routing table through a node address.

2. The method according to claim 1, wherein the switching a service on an NC link to a corresponding HBA link comprises:

searching, by using the first routing table, for an address of a node where a NC chip in which the failure occurs is located;

searching, by using the second routing table, for an HBA apparatus corresponding to the address; and switching a service on the NC link borne by the NC chip in which the failure occurs to the corresponding HBA link borne by the HBA apparatus.

3. The method according to claim 1, further comprising: when an operating system detects that a bandwidth occupation rate of an NC link on a node exceeds a threshold, notifying the node to switch a service conforming to a preset table from the NC link to a corresponding HBA link.

4. The method according to claim 1, wherein a manner in which the HBA apparatus is connected to each CPU in a node where the HBA apparatus is located is: the HBA apparatus is inserted in a north bridge chip, and the north bridge chip is connected to each CPU through a front side bus.

5. The method according to claim 1, wherein a manner in which the HBA apparatus is connected to each CPU in a node where the HBA apparatus is located is: the HBA apparatus is directly mounted on each CPU.

6. A processor system, comprising more than two nodes capable of communicating with each other, wherein each node comprises a node controller NC chip, a host bus adapter HBA apparatus, and at least one CPU, the NC chip is connected to each CPU in a node where the NC chip is located, the HBA apparatus is connected to each CPU in a node where the HBA apparatus is located, and an NC link borne by the NC chip corresponds to an HBA link borne by the HBA apparatus; and when it has been detected that a failure occurs in the NC chip of the node itself, the node switches a service on an NC link borne by the NC chip to a corresponding HBA link;

wherein the node is configured to:

store a first routing table and a second routing table which are preset, wherein the first routing table is a routing table of an NC chip in each node and each NC chip corresponds to an address of a node where the NC chip is located, the second routing table is a routing table of an HBA apparatus in each node and each HBA apparatus corresponds to an address of a node where the HBA apparatus is located, and the first routing table corresponds to the second routing table through a node address.

7. The processor system according to claim 6, wherein the node is further configured to:

switch a service that is on an NC link and conforms to a preset table to a corresponding HBA link, when receiving a notification of an operating system about switching the NC link of this node.

8. A node, comprising:

a node controller NC chip, a host bus adapter HBA apparatus, a controller, and at least one CPU, wherein the NC chip is connected to each CPU in a node where the NC chip is located, the HBA apparatus is connected to each CPU in a node where the HBA apparatus is located, and an NC link borne by the NC chip corresponds to an HBA link borne by the HBA apparatus; and the controller is configured to, when it has been detected that a failure occurs in the NC chip of the node itself, switch a service on an NC link borne by the NC chip to a corresponding HBA link;

wherein the node further comprising a storage device, configured to store a first routing table and a second routing table which are preset, wherein the first routing table is a routing table of an NC chip in each node and each NC chip corresponds to an address of a node where the NC chip is located, the second routing table is a routing table of an HBA apparatus in each node and each HBA apparatus corresponds to an address of anode where the HBA apparatus is located, and the first routing table corresponds to the second routing table through a node address.

9. The node according to claim 8, wherein the controller is further configured to:

switch a service that is on the NC link and conforms to a preset table to a corresponding HBA link, when receiving a notification of an operating system about switching the NC link of this node.

\* \* \* \* \*